United States Patent [19]

Burton

[11] Patent Number: 5,188,293

[45] Date of Patent: Feb. 23, 1993

[54] FLUID APPLICATING AND VEHICLE WASHING APPARATUS

[75] Inventor: Forrest R. Burton, Green Bay, Wis.

[73] Assignee: P.D.Q. Manufacturing Inc., Green Bay, Wis.

[21] Appl. No.: 833,809

[22] Filed: Feb. 10, 1992

Related U.S. Application Data

[63] Continuation of Ser. No. 514,006, Apr. 25, 1990, abandoned.

[51] Int. Cl.$^5$ ............................ B05B 3/06; B05B 3/12
[52] U.S. Cl. .................................. 239/227; 239/227; 239/548; 134/172
[58] Field of Search ................ 239/227, 264, 265, 548; 134/172, 180, 185

[56] References Cited

U.S. PATENT DOCUMENTS

| | | | |
|---|---|---|---|
| 1,586,997 | 6/1926 | Hull | 239/265 X |
| 1,614,430 | 1/1927 | Mart | 239/565 X |
| 1,866,197 | 7/1932 | Cunningham . | |
| 2,104,330 | 1/1938 | Lockey | 239/548 X |
| 2,221,876 | 11/1940 | Mackin . | |
| 2,419,397 | 4/1947 | Frohoff . | |
| 2,665,760 | 1/1954 | Hulsey | 239/565 X |
| 2,683,626 | 7/1954 | Wahlin | 239/565 X |
| 2,900,950 | 8/1959 | Peeps . | |
| 3,038,481 | 6/1962 | Brechtel . | |
| 3,259,138 | 7/1966 | Heinicke . | |
| 3,339,565 | 9/1967 | Williams . | |
| 3,391,701 | 7/1968 | Richardson et al. | 134/181 X |
| 3,410,284 | 11/1968 | Burger . | |
| 3,432,346 | 3/1969 | Hurst . | |
| 3,481,346 | 12/1969 | McBurnett . | |
| 3,529,611 | 9/1970 | Daum et al. . | |
| 3,533,422 | 10/1970 | Alimanestiano . | |
| 3,557,808 | 1/1971 | Gusse . | |
| 3,578,775 | 5/1971 | McMillen . | |
| 3,650,281 | 3/1972 | Hurst . | |
| 3,701,356 | 10/1972 | Hanna et al. . | |
| 3,918,639 | 11/1975 | Binasik | 239/567 X |
| 4,220,170 | 9/1980 | Herbert et al. | 239/227 X |
| 4,244,523 | 1/1981 | Looper | 239/227 |
| 4,613,075 | 9/1986 | Owen | 239/553.3 X |
| 4,651,925 | 3/1987 | Harris | 239/264 X |
| 4,716,916 | 1/1988 | Hodge . | |
| 4,719,932 | 1/1988 | Burton . | |
| 4,971,084 | 11/1990 | Smith et al. | 134/181 |

FOREIGN PATENT DOCUMENTS 378016 9/1932 United Kingdom .
509564 8/1939 United Kingdom .

OTHER PUBLICATIONS

Brochure entitled "Mr. Spinner" by Northwest Hydraulic Services, Inc., (undated) two pages.
Article entitled "Knocking It Off: Water Impact Plays A Key Role In Pressure Cleaning" by Jess C. Henderson, *Pressure Points*, Jun. 1988, pp. 20–23.
Equipment brochures from PDQ Manufacturing, Inc., undated, totalling 12 pages.

*Primary Examiner*—Andres Kashnikow
*Assistant Examiner*—Kevin P. Weldon
*Attorney, Agent, or Firm*—Willian Brinks Olds Hofer Gilson & Lione

[57] ABSTRACT

Fluid applicating and vehicle washing apparatus and processes are disclosed. In one embodiment, the apparatus includes a plurality of fluid delivery nozzles directed to spray fluid in a clustered pattern in parallel directions toward the vehicle. The nozzles are mounted on a central pipe that is made to rotate about an axis generally parallel to, but at an angle with, the direction of fluid delivery. In a preferred embodiment, the nozzles are zero degree nozzles, mounted on 90° elbows arranged helically on a central pipe. The central pipe is fixed to an extension pipe which has an axis making a fixed angle of 5° to 20° with the axis of the central pipe. The use of a clustered spray of zero degree nozzles is found to produce a synergistic cleaning effect.

25 Claims, 3 Drawing Sheets

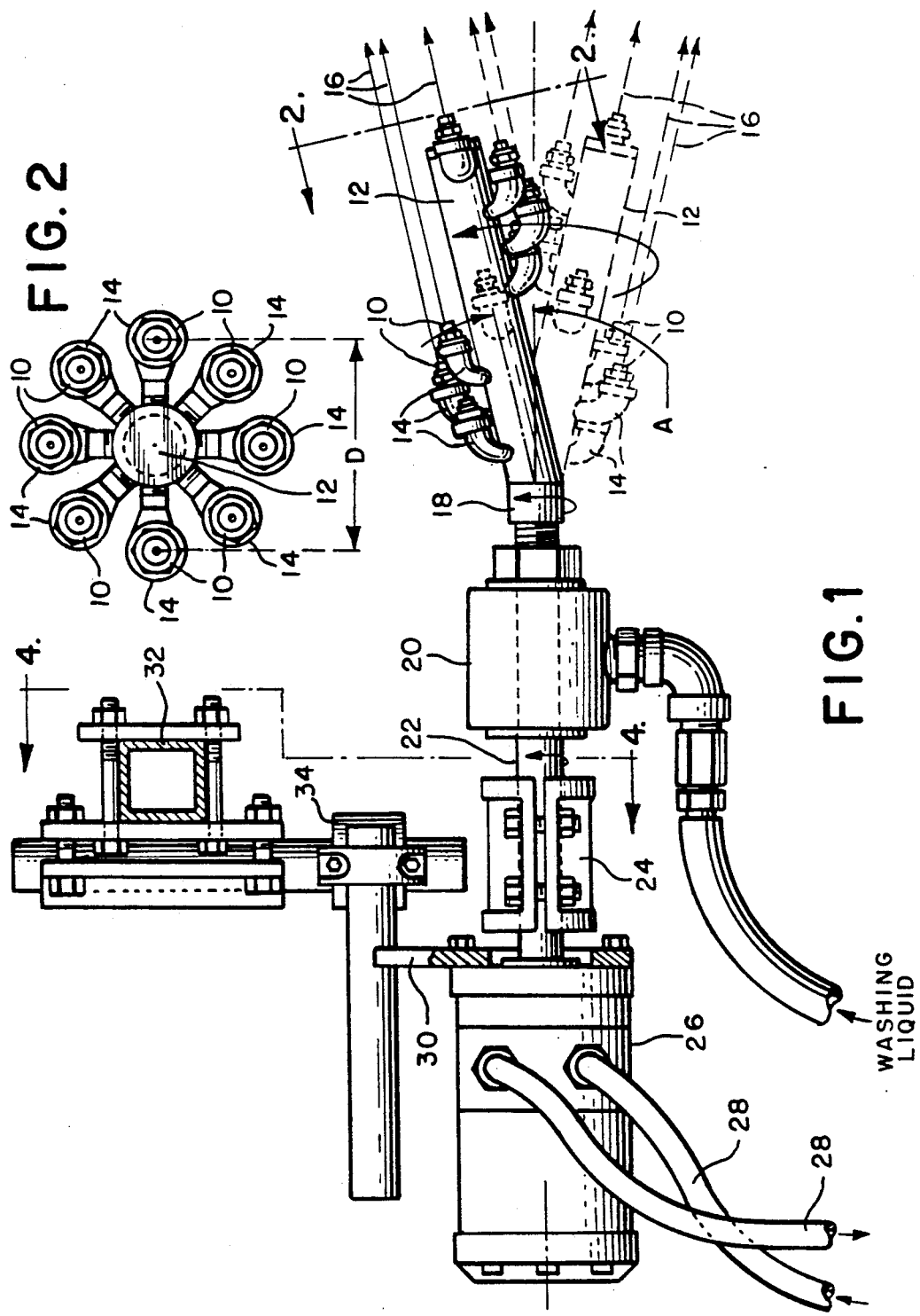

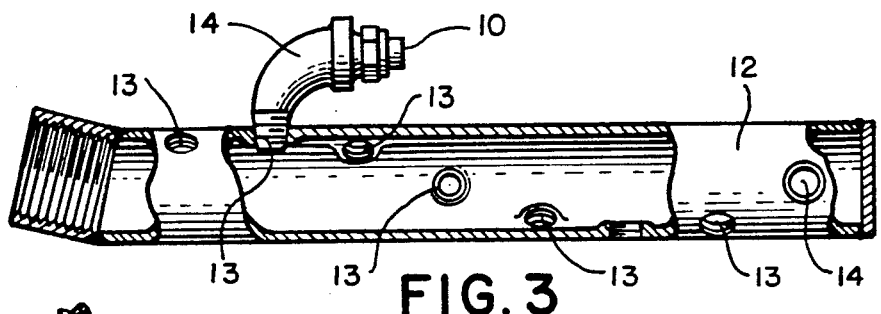
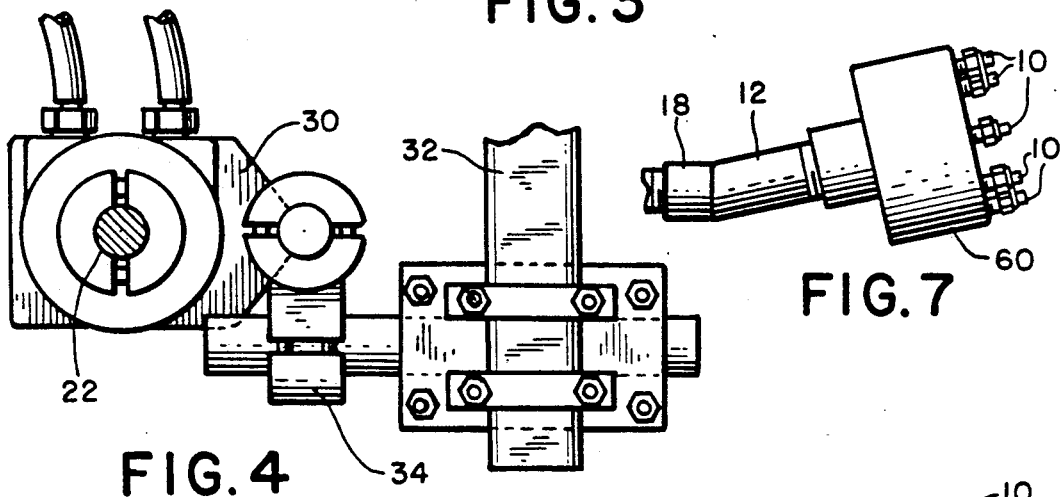
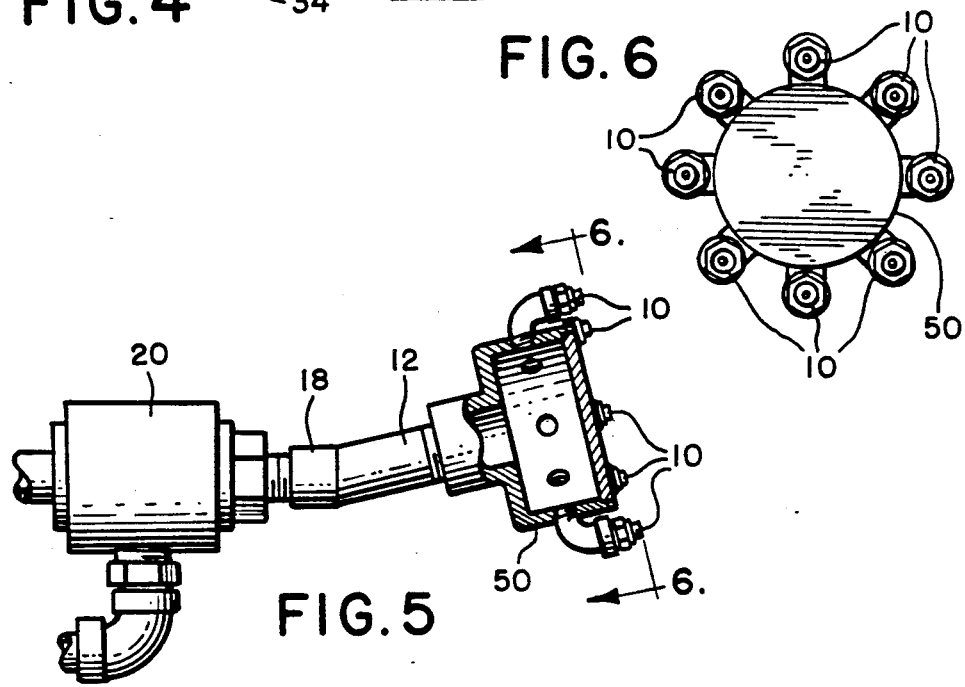

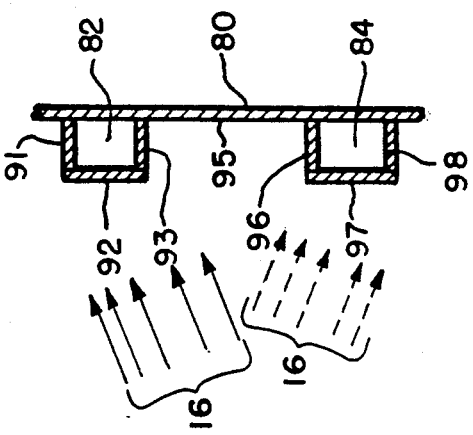
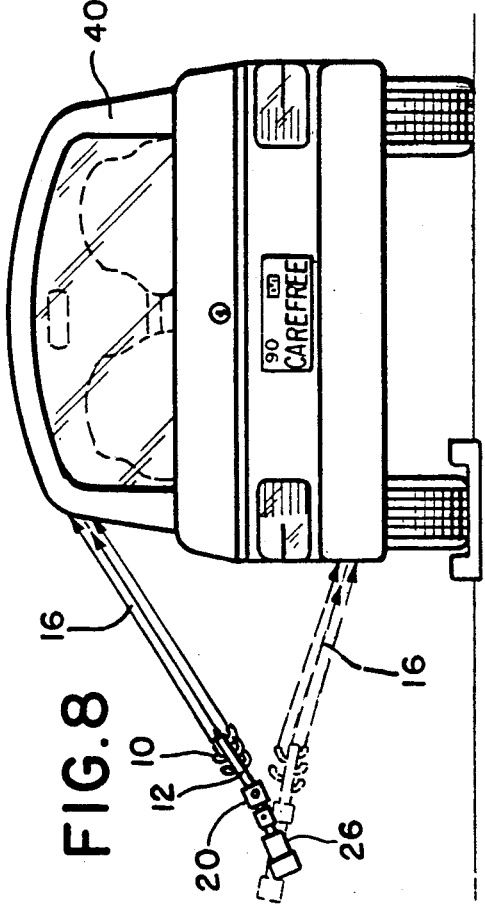
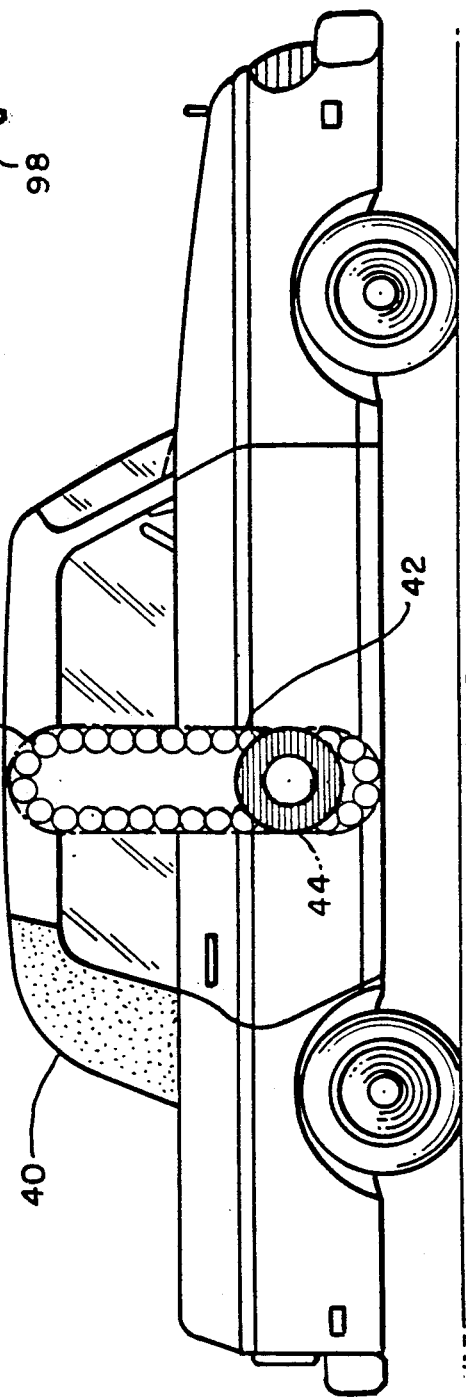

FLUID APPLICATING AND VEHICLE WASHING APPARATUS

This application is a continuation of application Ser. No. 07/514,006, filed Apr. 25, 1990, now abandoned.

BACKGROUND OF THE INVENTION

The present invention relates to fluid applicating and vehicle washing apparatus, and particularly to such apparatus which delivers a clustered spray of fluid in a repeating two dimensional pattern.

A number of fluid applicating devices have been developed, many of which are designed for washing vehicles. Many of such devices use a plurality of nozzles to deliver fluid for washing the vehicles. In most instances of vehicle washing apparatus, the nozzles and vehicles move relative to one another so that fluid from a given nozzle covers an area larger than the spray pattern of the nozzle itself. See, for example, U.S. Pat. No. 4,719,932. For the most part, however, the covered area is extended in only one direction, or, in other words, the covered area has only one dimension larger than the spray pattern of the nozzle itself. In other instances, the nozzles are made to reciprocate in one plane while the vehicle passes by in a direction perpendicular to that plane.

Zero degree nozzles are well known in the vehicle washing art. They have the advantage of providing high fluid flow rates at the vehicle surface, thus helping to remove dirt from the surface. Because the stream from a zero degree nozzle does not diverge, however, the area impacted by a single nozzle is very small. Further, when zero degree nozzles are used in reciprocating devices, especially where the vehicle passes perpendicularly past the plane of reciprocation, the washed pattern often has a "zebra" look, alternating stripes of washed and unwashed surfaces.

A recently advertised piece of car wash equipment, titled "Mr. Spinner" and sold by Northwest Hydraulic Services, Inc., Warren, Ohio, includes a spinning head with two or four zero degree nozzles mounted on 90° elbows secured into the circumference of the head. Apparently the spray axis of the nozzle is slightly off angle from the axis of rotation of the head so that the diameter of the spray pattern is larger than the distance between the nozzles. As the head rotates, a circular pattern is sprayed. Apparently each nozzle is positioned off angle by the same amount, so that each nozzle sprays the same diameter circle. In one system described, three Mr. Spinner heads are mounted in a vertical line, to spray three circular patterns stacked on top of each other. Apparently the vertical stack may be arranged in an "oscillating" column, where the entire system oscillates on an axis of rotation parallel to the vertical stacking alignment. As a vehicle moves past the vertical system, either oscillating or stationary, each head sprays a horizontally extending rectangular area. Depending on the distance between heads and the spray diameter, these three areas may apparently be made to overlap to cover the entire side of the vehicle. The heads are said to rotate at 1000 rpm or more depending on water system pressure.

One disadvantage of the "Mr. Spinner" system is that multiple heads are required to cover the entire side of the vehicle. Further, the areas at the tops and bottoms of the circular pattern, especially if those patterns overlap, receive more washing fluid than the central sections. Thus either washing fluid is wasted if the vehicle speed is slow enough to assure that the central sections are cleaned, or there is unevenness of cleaning if the vehicle speed is increased.

Certain vehicles present particularly difficult washing situations. For example, many trucks have side walls which include reinforcing ribs that extend in a plane perpendicular to the surface of the side wall. Fluid sprays directed at the side wall do not clean such perpendicular surfaces. If a nozzle is pointed at a non-perpendicular angle toward the side wall, it may be able to clean one perpendicular side of the reinforcing rib, but not the opposite side. Of course, multiple nozzles could be mounted at opposing non-perpendicular angles to reach both of such perpendicular surfaces, but this requires twice the number of nozzles and associated plumbing.

SUMMARY OF THE INVENTION

A vehicle washing apparatus has been developed which overcomes many of these limitations. The apparatus comprises a plurality of fluid delivery nozzles directed to spray fluid in a cluster pattern, a first means for rotating the plurality of nozzles about an axis generally parallel to the direction of fluid delivery and thus changing the direction of spray relative to the vehicle being washed.

In one embodiment of the invention, a central pipe is secured to an extension pipe such that the longitudinal axis of the central pipe forms an angle with the longitudinal axis of the extension pipe of between about 5° and 20°. Fluid is supplied to said central pipe, while the extension pipe is rotated about its longitudinal axis. Fluid delivery nozzles secured to the central pipe thus deliver a spray of fluid which covers an area larger in both directions than the area covered by the spray from the nozzles if the extension pipe were held stationary.

Because of the angle and the rotation, one set of nozzles sprays in a forward, upward, reverse, downward repeating circular cycle, as considered from the axis of the rotating extension pipe. Thus, a truck passing in front of the nozzles, perpendicular to this axis, will have the side walls of protruding ribs washed by this single piece of equipment.

In another aspect, the invention utilizes the synergistic cleaning advantages of spraying fluid in a cluster pattern where each spray is within about two inches or less of another spray. Regardless of how the area of this clustered pattern is made to move to wash a vehicle, the cleaning provided by such a simultaneous clustered spray is significantly improved compared to applying the same sprays in the same places but at different times.

Other advantages, as well as the invention itself, will best be understood in view of the attached drawings, a description of which follows:

BRIEF DESCRIPTION OF THE DRAWINGS

FIG. 1 is a top plan view of one preferred embodiment of the invention.

FIG. 2 is a front perspective view taken along line 2—2 of FIG. 1.

FIG. 3 is a partial sectional view of the central pipe and associated nozzles shown in FIG. 1.

FIG. 4 is a sectional view taken along line 4—4 of FIG. 1.

FIG. 5 is a partial side elevational view of a second embodiment of the invention.

FIG. 6 is a perspective view taken along line 6—6 of FIG. 5.

FIG. 7 is a partial side elevational view of a third embodiment of the invention.

FIG. 8 is a perspective view of the apparatus of FIG. 1 mounted on a horizontal pivotal axis next to a car being washed.

FIG. 9 is a side elevational view of the car of FIG. 8 showing the area of coverage by the apparatus as mounted in FIG. 8.

FIG. 10 is a partial sectional view depicting a portion of the side wall of a truck which may be advantageously washed by the present invention.

DETAILED DESCRIPTION OF THE DRAWINGS AND PREFERRED EMBODIMENTS

One preferred apparatus embodiment of the present invention is shown in FIG. 1. The apparatus of FIG. 1 includes eight fluid delivery nozzles 10 mounted to a central pipe 12. The nozzles are fixed into the end of 90° elbows 14, screwed into holes 13 lying in a helical pattern down the outside surface of central pipe 12 (see FIG. 3). The forward end of pipe 12 is closed, as shown in FIG. 3. Also, as shown in FIG. 2, the nozzles 10 are evenly spaced around the circumference of central pipe 12, and aimed parallel with the longitudinal axis of central pipe 12. The fluid flow exiting from the nozzles 10 is depicted by arrows 16 in FIG. 1, Central pipe 12 is welded to an extension pipe 18. The longitudinal axis of central pipe 12 forms an angle A with the longitudinal axis of extension pipe 18.

Extension pipe 18 is threaded so that it can be screwed onto a rotary joint 20, which has a supply of washing fluid connected thereto. Fluid entering the joint 20 flows through the extension pipe 18, into the central pipe 12 and out of the nozzles 10.

The rotary joint 20 includes a shaft 22 extending opposite extension pipe 18. A coupling 24 connects shaft 22 to a hydraulic motor 26. Hydraulic fluid supply and return lines 28 provide power to the hydraulic motor 26. Since the hydraulic motor 26 is fixed to bracket 30, the output of hydraulic motor 26 turns coupling 24, shaft 22, extension pipe 18 and central pipe 12. Thus the hydraulic motor 26 provides a means for rotating the plurality of fluid delivery nozzles about an axis generally parallel to the direction of fluid delivery from the nozzles. Since central pipe 12 is mounted at an angle, rotation of extension pipe 18 causes the array of nozzles 10 to change their direction of spray. The position of central pipe 12, nozzles 10 and the spray after one-half of a revolution are shown in phantom lines in FIG. 1. Thus, in this instance, the combination of the hydraulic motor 26 and the angle between the extension pipe 18 and central pipe 12 provides a means for changing the direction of spray relative to the vehicle being washed.

In the preferred embodiment, each of the nozzles 10 is a zero degree nozzle. Thus, the eight nozzles 10 provide a clustered spray pattern of eight fluid streams in a circular pattern. The diameter of that circle is equal to the distance between nozzles 10 on opposite sides of central pipe 12 (shown as D in FIG. 2).

As the extension pipe 18 rotates, the circular area covered by the spraying fluid also moves in a circular pattern, covering an annular area. The width of that annulus is equal to the diameter D. The diameter of the annulus is a function of the angle A and the distance between the surface being washed and the extension pipe 18. The further the distance between the surface being washed and the extension pipe 18, or the greater the angle A, the larger in diameter the annulus will be. In any event, the annulus covered will be larger in horizontal and vertical dimensions than the diameter D. It is preferred to keep the apparatus fairly close to the vehicle being washed so that the inside diameter of the annulus is small.

As shown in FIGS. 1 and 4, bracket 30 may be used to secure the apparatus to other structural members. Such as vertical beam 32. In the preferred embodiment, the mounting structure includes a hinged axis such as at connection 34, allowing the entire apparatus to pivot about an axis perpendicular to the axis of rotation of the rotary joint 22. In this manner, the annular area covered by the spray from nozzles 10 can be made to move, covering an oval pattern. In the embodiment of FIG. 1 with a pivot mounting, the reactive forces caused by the fluid exiting the nozzles 10 will automatically cause the apparatus to pivot, since the forces are not applied in a line passing through the axis of the pivot point. Moreover, as the extension pipe 18 rotates, the direction of the reactive forces changes, thus causing the apparatus to reciprocally pivot.

FIG. 8 shows the apparatus of the preferred embodiment mounted next to an automobile 40 being washed. (The term "automobile" as used herein includes not only cars like the sedan shown, but other vehicles such as vans, pick-up trucks and the like as well.) The apparatus is depicted as being able to pivot about a horizontal axis perpendicular to the axis of rotation of the extension pipe 18. Thus, the oval coverage pattern 42 is elongated in the vertical direction, as shown in FIG. 9. At any given instant, all of the fluid from nozzles 10 will impinge on the sub area 43. The annular area of coverage from one revolution of extension pipe 18 (disregarding any pivoting motion) is shown as area 44 in FIG. 9.

FIGS. 5 and 7 show two other embodiments of the present invention. In FIG. 5, the nozzles 10 are mounted on a head 50 attached to the end of the central pipe 12. As shown in FIG. 6, the nozzles 10 are equally spaced about the circumference of head 50, mounted on elbows as in FIG. 1, In FIG. 7, a head 60, similar to head 50, is used, but the nozzles 10 are tapped directly into the face of the head 60. The arrangement of the nozzles 10 on the face of head 60 can be circular, or another pattern may be used.

In each of the embodiments of FIGS. 1, 5 and 7, the nozzles 10 spray in a clustered pattern. In each of these embodiments, the nozzles 10 are preferably zero degree nozzles. It is believed that simultaneous impingement of the sprays from a cluster of zero degree nozzles gives better cleaning than if the same amount of fluid was delivered by the same nozzles in a sequential fashion. For this reason, it is preferred to use clusters of zero degree nozzles in the present invention.

FIG. 10 shows a partial cross section of a vehicle side wall 80 which uses vertical channel iron reinforcing ribs 82 and 84. This type of side wall is common on trucks, such as over-the-road semi-trailer rigs, garbage trucks and the like. The arrows 16, showing the fluid delivery direction taken from FIG. 1, illustrate how the apparatus of FIG. 1 is useful to wash vehicles with such ribs. The sides of the ribs in FIG. 10 are numbered for ease of reference. The forward facing sides of ribs 82 and 84 are respectively numbered 91 and 96, the rearward facing sides are respectively numbered 93 and 98, and the outward facing sides are respectively numbered 92 and 97. The area of the vehicle side wall between the ribs is numbered 95.

As can be seen from the arrows 16, when the apparatus of FIG. 1 is positioned such that the centerline of extension pipe 18 intersects side 95, the fluid spray from the nozzles 10 will wash perpendicular sides 93 and 96 during rotation of the extension pipe, as well as sides 92, 95, and 97. As the vehicle moves to the point where rib 84 is in the position rib 82 formerly occupied, side 98 will also be washed. Likewise, side 91 would have been washed when rib 82 was in the relative position of rib 84. Of course the vehicle can remain stationary and the apparatus of FIG. 1 can be made to move to achieve the same result, In either event, in one pass of the vehicle, and with only one set of nozzles, fluid from each of the nozzles 10 will impinge on both of the perpendicular sides of each of the protruding ribs 82 and 84.

A preferred rotary joint 22 is available from the Deublin Company, Northbrook, Illinois. The preferred angle A is 13°, but depending on the application, angles of between about 5° and 20° are satisfactory. The central pipe is preferably 1 inch stainless steel pipe, and the holes 13 to accept elbows 14 are preferably made by a flow drill process. While zero degree nozzles are preferred, it is believed that nozzles with about 10° or less divergence will also be suitable for many applications. The preferred fluid flow is 14 gallons per minute at 950 psi with 0004 size zero degree nozzles.

The preferred distance D is about 3 inches. In this embodiment, the cluster of fluid sprays contains eight sprays in a 3 inch diameter ring. Further, no fluid spray is more than about one inch from any other spray, and in this case, from two other sprays. It is believed that having the fluid sprays such that each spray is within about two inches or less of another spray results in a synergistic cleaning effect, compared to individual sprays. Also, when all the sprays travel within this close proximity to each other, they seem to reduce the air resistance which otherwise would act on the sprays individually. The combined, clustered sprays thus impinge on the vehicle surface with greater concentration and force, resulting in better cleaning.

Though the invention has been described specifically for washing automobiles and trucks, it can be used to wash other vehicles, such as locomotive and other railroad cars, boats and even airplanes. It has been found particularly advantageously suited to wash garbage trucks.

In addition to washing vehicles, the apparatus of the present invention may be used to apply other fluids in a variety of situations, such as other cleaning or surface treatment operations, chemical application operations, painting or other coating operations and the like.

Of course, it should be understood that a wide range of changes and modifications can be made to the preferred embodiments described above. For example, a separately rotating head such as a "Mr. Spinner" head could be secured on the end of central pipe 12, which would add one more direction of rotation to the cleaning apparatus. Rotary mechanisms other than a hydraulic motor, including electric or pneumatic motors, could be used. Also, rather than providing a central pipe 12 angled from the axis of rotation of the extension pipe 18, other means could be used to change the relative direction of the axis of rotation and the surface of the vehicle being washed. For example, a central pipe could be held on a universal joint and a cam and follower arrangement attached to the rear of the central pipe could be used to change the axis of the central pipe. In some instances, such as where heavily-caked mud is common, higher flow rates through larger nozzles may be preferred. It is therefore intended that the foregoing detailed description be regarded as illustrative rather than limiting, and that it be understood that it is the following claims, including all equivalents, which are intended to define the scope of this invention.

I claim:

1. A vehicle washing apparatus comprising:
   a) a plurality of fluid delivery nozzles directed to spray fluid in a clustered pattern in parallel directions towards the vehicle and,
   b) a first means for rotating said plurality of nozzles about an axis generally parallel to, but at an angle with, the direction of fluid delivery from the nozzles, thus
   changing said direction of spray relative to the vehicle being washed.

2. The vehicle washing apparatus of claim 1 wherein the plurality of fluid delivery nozzles comprise zero degree nozzles.

3. The vehicle washing apparatus of claim 1 further comprising mounting means comprising a hinged axis such that reactive forces caused by fluid exiting said fluid delivery nozzles cause said axis of rotation to pivot about said hinged axis in a reciprocating fashion.

4. The vehicle washing apparatus of claim 1 further comprising a second means for changing the angular relationship between the axis of rotation and the vehicle.

5. The vehicle washing apparatus of claim 4 wherein said second means comprises a mounting for said plurality of fluid delivery nozzles including a pivot point spaced from the line of force generated from fluid existing said nozzles.

6. A fluid delivery apparatus comprising:
   a) a central pipe with an extension pipe secured in a fixed relation to one end thereof, the longitudinal axis of the central pipe forming a fixed angle with the longitudinal axis of the extension pipe of between about 5° and about 20°;
   b) means for supplying fluid to said central pipe;
   c) means for rotating said extension pipe about its longitudinal axis; and
   d) a plurality of fluid delivery nozzles secured to said central pipe.

7. The fluid delivery apparatus of claim 6 wherein the means for supplying fluid so said central pipe comprises said extension pipe coupled to a rotary joint having a fluid supply connected thereto.

8. The fluid delivery apparatus of claim 7 wherein the means for rotating said extension pipe comprises a hydraulic motor coupled to said extension pipe through said rotary joint.

9. The fluid delivery apparatus of claim 5 wherein said fluid delivery nozzles are attached to the outside surface of said central pipe in a generally helical pattern.

10. The fluid delivery apparatus of claim 5 wherein said fluid delivery nozzles are attached to a head mounted on the end of said central pipe.

11. The fluid delivery apparatus of claim 5 wherein the fluid delivery nozzles comprise at least four nozzles.

12. The fluid delivery apparatus of claim 8 wherein the plurality of fluid delivery nozzles are mounted on 90° elbows extending from holes located about the surface of the central pipe, said holes comprising a generally helical pattern.

13. The fluid delivery apparatus of claim 12 wherein the plurality of nozzles comprise a plurality of zero degree nozzles.

14. A process for washing a vehicle comprising the steps of:
   a) providing a plurality of zero degree fluid delivery nozzles mounted on a means so as to spray fluid on said vehicle in a clustered spray pattern wherein each of the sprays impinges on the surface of the vehicle within about two inches of another spray in the cluster impinging on the vehicle surface; and
   b) moving said nozzle mounting means in a circular pattern while providing fluid to said nozzles.

15. The process of claim 14 wherein the vehicle is selected from the group consisting of automobiles, trucks, locomotives and other rail road cars, boats and airplanes.

16. The process of claim 14 wherein:
   a) the vehicle being washed and the nozzle mounting means are moved relative to each other;
   b) the vehicle has protruding structural members which have two-sided surfaces to be washed, said surfaces each extending generally perpendicular to said direction of movement; and
   c) the pattern and speed of moving said nozzle mounting means allows fluid from each of the plurality of nozzles to impinge on both of said surfaces.

17. The process of claim 14 wherein each of the sprays of fluid is within about one inch or less of at least two other sprays in the cluster.

18. A fluid deliver apparatus comprising a central pipe, a means for supplying fluid to said central pipe and a plurality of fluid delivery nozzles, each attached to a 90° elbow extending from a hole located on the surface of said central pipe, said holes being arranged in a generally helical pattern, wherein the elbows are all arranged so that the nozzles spray fluid in a direction generally parallel with said central pipe.

19. The fluid delivery apparatus of claim 18 wherein the plurality of nozzles comprise at least four nozzles.

20. The fluid delivery apparatus of claim 18 wherein the plurality of nozzles comprises a plurality of zero degree nozzles.

21. A vehicle washing apparatus comprising at least four zero degree nozzles with each of said nozzles configured and positioned so as to spray a solid stream of fluid in a direction parallel to the stream from each of the other nozzles and in a clustered spray pattern wherein each of the sprays is within two inches of another spray in the cluster.

22. The fluid delivery apparatus of claim 21 wherein the nozzles are positioned such that each of the sprays is within about one inch of another spray in the cluster.

23. The fluid delivery apparatus of claim 22 wherein the nozzles are positioned such that each of the sprays is within about one inch of two other sprays in the cluster.

24. The fluid delivery apparatus of claim 21 comprising eight nozzles configured in a ring arrangement, the ring having a diameter of about 3 inches.

25. A vehicle washing apparatus comprising:
   a) at least four zero degree nozzles with each of said nozzles positioned so as to spray fluid in a direction parallel to each of the other nozzles and in a clustered spray pattern wherein each of the sprays is within about two inches of another spray in the cluster, the nozzles being mounted so as to rotate about an axis intersecting the vehicle; and
   b) a means for changing the angular relationship between the axis of rotation and the vehicle.

* * * * *

UNITED STATES PATENT AND TRADEMARK OFFICE
CERTIFICATE OF CORRECTION

PATENT NO. : 5,188,293                                      Page 1 of 2
DATED      : February 23, 1993
INVENTOR(S): Forrest R. Burton It is certified that error appears in the above-indentified patent and that said Letters Patent is hereby corrected as shown below:

In column 4, lines 11-12, delete "members. Such" and insert --members, such--.

In column 4, line 58 after "FIG" delete the "," and insert --.--.

In column 5, line 16 after "result" delete the "," and insert --.--.

IN THE CLAIMS

Col. 6, line 19, claim 1, after "thus" insert --changing said direction of spray relative to the vehicle being washed.--

Col. 6, line 20, delete "changing said direction of spray relative to the vehicle being washed."

Col. 6, lines 37-38, delete "existing" and insert --exiting--.

Col. 6, line 51, delete "so" and insert --to--.

UNITED STATES PATENT AND TRADEMARK OFFICE
CERTIFICATE OF CORRECTION

PATENT NO. : 5,188,293
DATED : February 23, 1993
INVENTOR(S) : Forrest R. Burton It is certified that error appears in the above-indentified patent and that said Letters Patent is hereby corrected as shown below:

Col. 7, line 34, delete "deliver" and insert
--delivery--.

Signed and Sealed this

Twenty-ninth Day of November, 1994

Attest:

BRUCE LEHMAN

Attesting Officer

Commissioner of Patents and Trademarks